BEST AVAILABLE COPY

F. PENTLARGE & P. HIRSCH,

Assignors, by mesne assignments, to F. PENTLARGE.

Vent Bung.

No. 9,733. Reissued May 31, 1881.

Witnesses:

Wm. R. Beeston

Leon Hirsh

Inventors:

Frederick Pentlarge

Philipp Hirsch

N. PETERS, Photo-Lithographer, Washington, D. C.

UNITED STATES PATENT OFFICE.

FREDERICK PENTLARGE AND PHILIPP HIRSCH, OF BROOKLYN, N. Y., ASSIGNORS, BY MESNE ASSIGNMENTS, TO SAID FREDERICK PENTLARGE.

VENT-BUNG.

SPECIFICATION forming part of Reissued Letters Patent No. 9,733, dated May 31, 1881.

Original No. 192,386, dated June 26, 1877. Application for reissue filed April 18, 1881.

*To all whom it may concern:*

Be it known that we, FREDERICK PENTLARGE and PHILIPP HIRSCH, both of Brooklyn, in the county of Kings and State of New York, heretofore invented an Improvement in Vent-Bungs, and duly assigned the same to the said FREDERICK PENTLARGE, to whom Letters Patent therefor were afterward issued under date of June 26, 1877, numbered 192,386.

Now be it known that the following is a correct specification and description of said invention:

A bung bored, cut, or otherwise excavated from both sides, so as to leave only a thin central web or segment, being an uncut part and portion of the original bung, included between the opposing bores, cuts, or excavations, and of a thinness not requiring such a blow to break or detach it as would fracture the remaining portion of the bung, and of a thickness adequate to prevent the passage of gas or fluid either way. Until so ruptured the uncut web or partition remains in place, to intercept and prevent the passage of gas or fluid one way or the other, and to re-enforce the bung at its central zone when driven tightly into the cask or other receptacle in which the bung is placed. But when venting is desired, upon applying a slight blow or pressure, the uncut web or segment (which is frangible and detachable throughout its perimeter, there only consisting of a thin circular partition of wood lying between two cavities) furnishes an immediate aperture and easy vent, and the structure remaining becomes an efficient receptacle for the venting-tube, if a venting-tube be used. Thus the uncut web or segment is detached at its perimeter and forced through, and its place supplied by the venting-tube, so that by the same act and movement a strong and efficient bung-stopple is instantly transformed or developed into a complete and effective venting apparatus.

The diameter of the upper bore or excavation is determined by the size of the venting-tube or vent intended to be used. The size of the lower bore, cut, or excavation may be the same as the upper one; but a better effect and working of the bung is obtained by making the diameter of the lower bore, cut, or excavation greater than that of the upper one, so that the segment of the bung forced out at venting comes away with greater ease.

Figure 1:
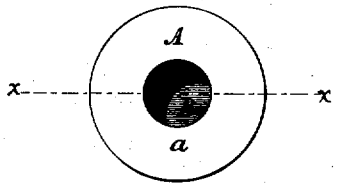
Figure 2:
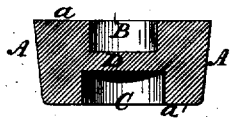

The annexed drawings, Figures 1 and 2, represent respectively a top view and a vertical section of a bung constructed as it has just been said it is better to construct them, and which are illustrations of the said invention.

In Figs. 1 and 2, the letter A indicates the body of the bung, D the uncut web, and B and C the opposing cavities.

We claim that the following is what is new and useful in our said invention:

1. In a vent-bung made and constructed substantially as described in Figs. 1 and 2, the transverse web D, having recesses formed respectively upon its inner and outer faces.

2. In a vent-bung made and constructed substantially as described in Figs. 1 and 2, the recess C on one side of the bung, of greater size than the recess B on the other side of the bung, substantially as described.

3. A vent-bung bored, cut, or otherwise excavated from both sides, so as to leave only a thin central web or segment, being an uncut part and portion of the original bung, included between the opposing bores, cuts, or excavations, and of a thinness not requiring such a blow to break or detach it as would fracture the remaining portion of the bung, and of a thickness adequate to prevent the passage of gas or fluid either way, substantially as described.

4. A vent-bung for casks, having its interior made frangible by boring or cutting out portions of each side or face of the bung, leaving the original material intact or uncut near its center, so as to remain a strong and efficient bung for stopping, and yet be capable by said construction of being instantly transformed or developed into a complete venting apparatus by punching out its frangible interior, substantially as described.

FREDERICK PENTLARGE.
PHILIPP HIRSCH.

Witnesses:
WM. R. BEESTON,
LEON HIRSH.